United States Patent [19]

Marcus

[11] 4,376,090
[45] Mar. 8, 1983

[54] INJECTION MOLDING SYSTEM
[76] Inventor: Paul Marcus, 85 Pascack Rd., Pearl River, N.Y. 10965
[21] Appl. No.: 339,666
[22] Filed: Jan. 15, 1982

Related U.S. Application Data

[63] Continuation of Ser. No. 43,184, May 29, 1979, abandoned.

[51] Int. Cl.³ .............................................. B29C 17/07
[52] U.S. Cl. .................................. 264/530; 264/532; 264/537
[58] Field of Search ............... 264/530, 537, 538, 532; 425/530, 533, 143, 144, 525, 526, 529, 534, 537, 538

[56] References Cited

U.S. PATENT DOCUMENTS

| | | | |
|---|---|---|---|
| 3,850,562 | 11/1974 | Takeuchi et al. | 425/533 X |
| 3,944,643 | 3/1976 | Sato et al. | 264/538 X |
| 4,061,705 | 12/1977 | Marcus | 264/538 X |
| 4,151,247 | 4/1979 | Hafele | 264/538 X |

FOREIGN PATENT DOCUMENTS 684611  12/1952  United Kingdom ................ 425/533

*Primary Examiner*—Jan H. Silbaugh
*Attorney, Agent, or Firm*—Kane, Dalsimer, Kane, Sullivan and Kurucz

[57] ABSTRACT

A single injection blow molding apparatus for making a selected oriented finished product. The apparatus includes the support structure and an injection molding station where a parison is injection molded into a selected configuration. A core rod assembly cooperates in forming the parison which is formed about a first core rod. The parison is conditioned to an orientation temperature. A transfer system is on the support structure for removing the first core rod from the parison and transferring the parison to a blow molding station. The blow molding station is on the support structure and is provided for blow molding the parison while at orientation temperature into the configuration of the finished product. A second core rod assembly with a second core rod cooperates in blowing the parison into the configuration of the finished product. The transfer structure on the support structure assembles the second core rod with the parison at the blow molding station and disassembles it from the oriented finished product. The transfer structure includes parison support to hold the parison when coupled with the core rod and the injection molding and blow molding stations and when removed therefrom to facilitate formation of a finished product and removal of the finished product from the apparatus. A number of different cooling stages are employed in the system. At one point a poppet valve is used to permit air to escape from the blow mold and hasten cooling. In an alternative form, a pre-cure station is provided between the injection molding station and each blow molding station to facilitate conditioning of the parison.

11 Claims, 12 Drawing Figures

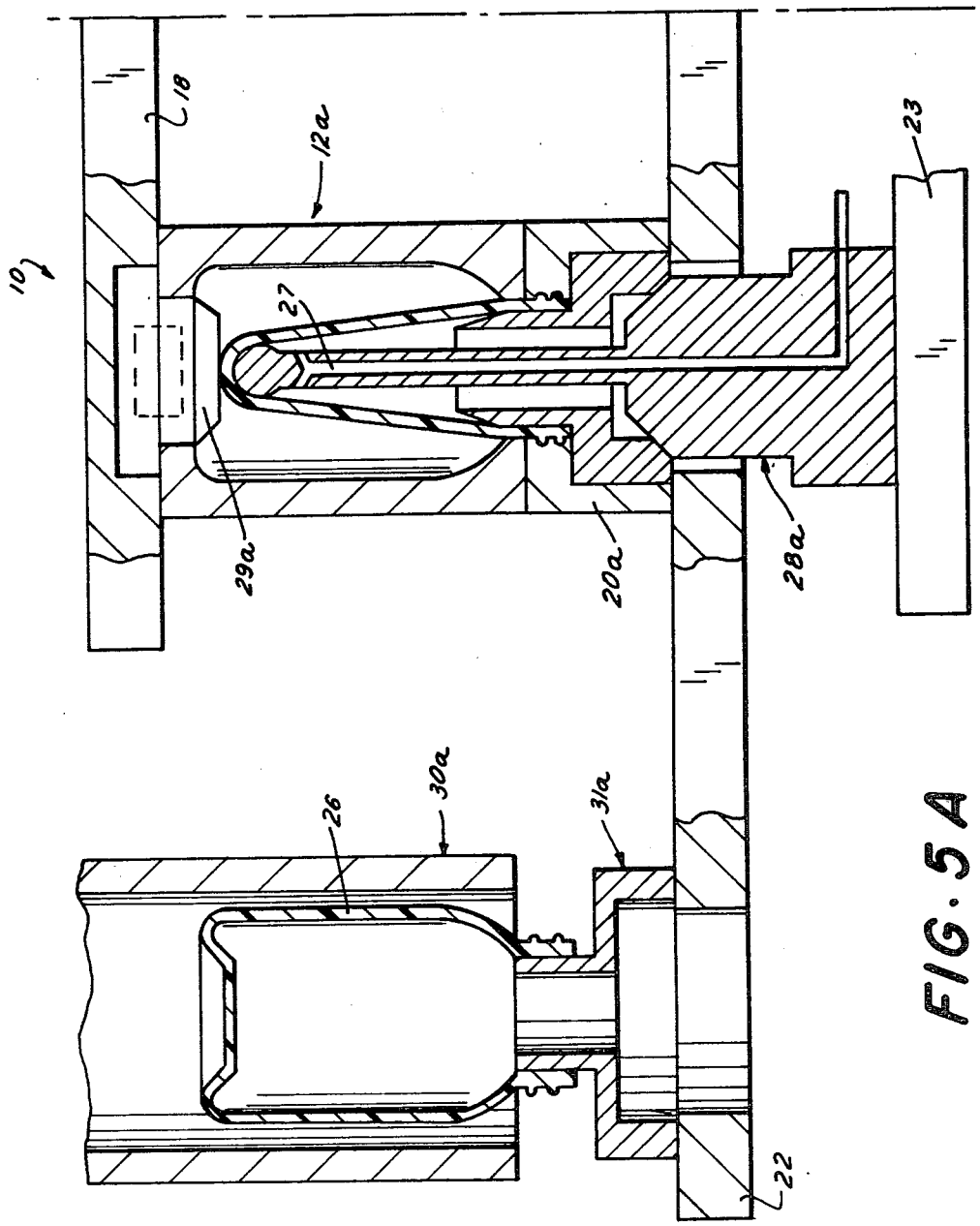

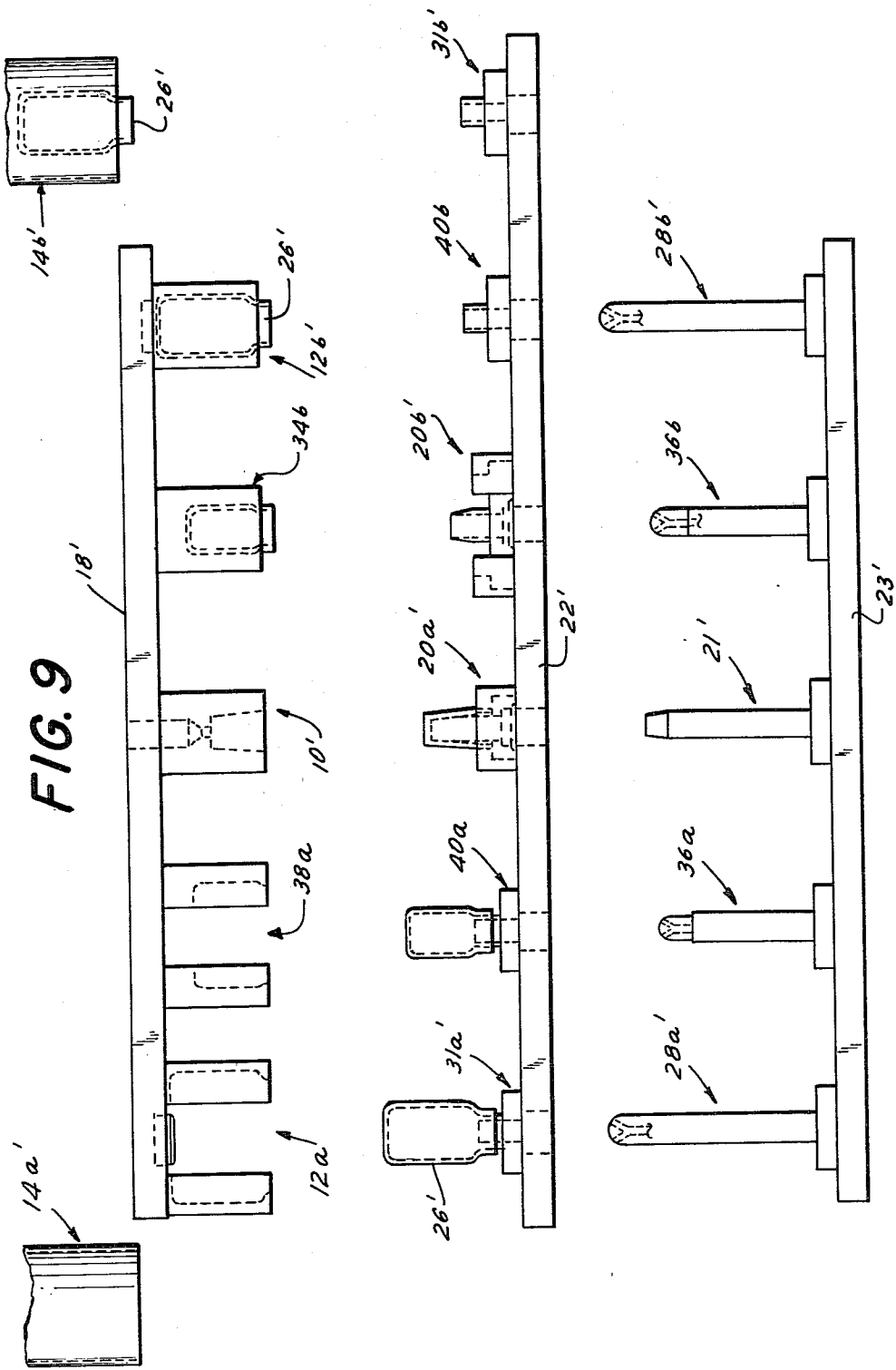

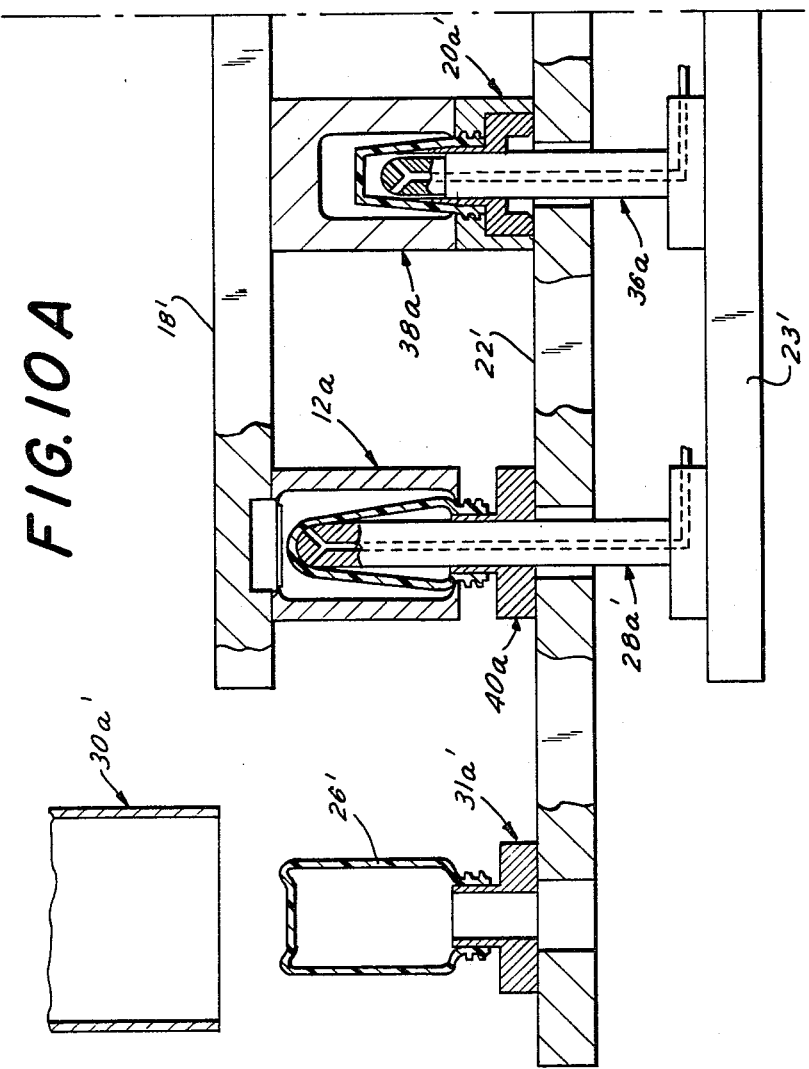

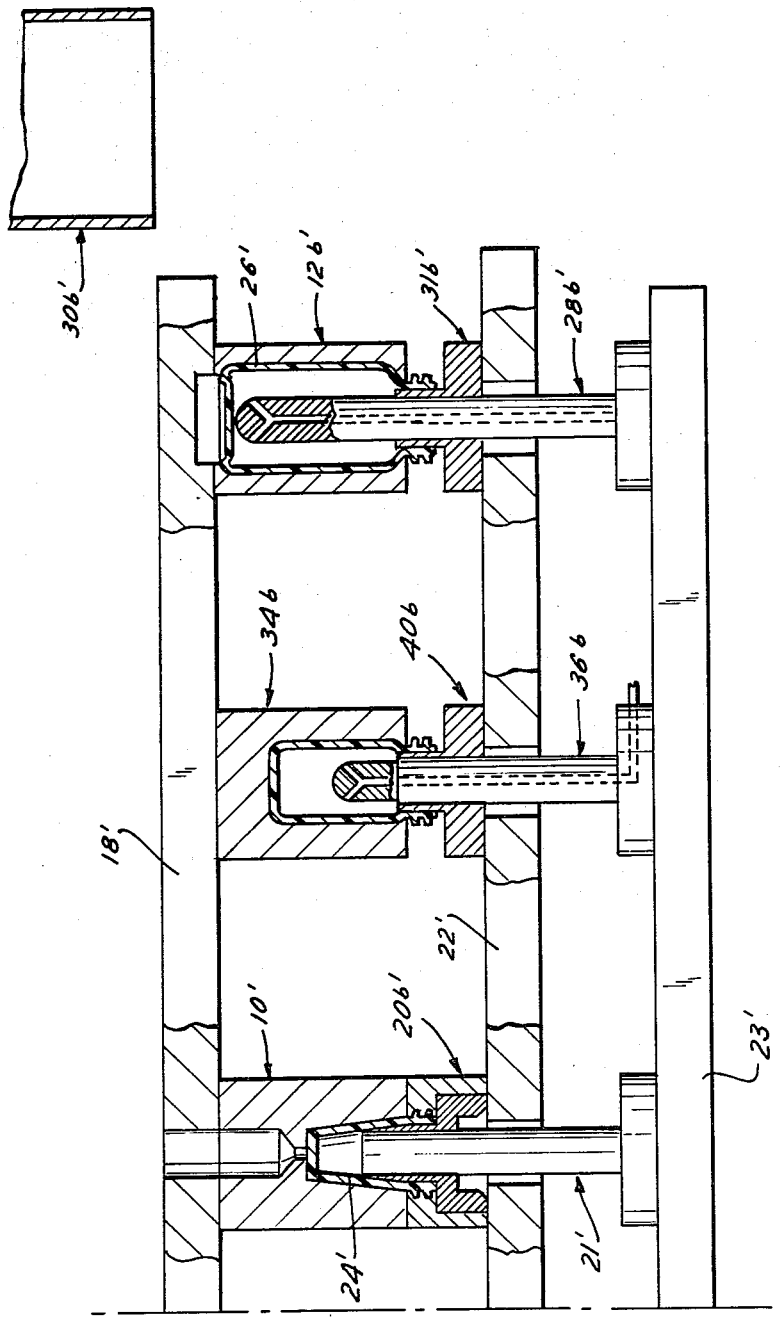

INJECTION MOLDING SYSTEM

REFERENCE TO RELATED APPLICATIONS

This application is a continuation of application Ser. No. 043,184 filed May 29, 1979, now abandoned.

BACKGROUND OF THE INVENTION

Injection blow molding systems are well known in the art and a variety of different sophisticated systems have been developed through the years. Representation of the present inventor's prior work in this area is clearly demonstrated by U.S. Pat. Nos. 3,535,742; 3,776,991; 3,819,314; 3,990,826; 4,061,705; and 4,065,246. The present invention represents further improvements in the injection blow molding field in general and the inventor's work, as represented by the above referenced patents, is incorporated herein by reference as background and for purposes of facilitating understanding of the present contribution.

SUMMARY OF THE INVENTION

The present invention relates to a method and apparatus for making hollow plastic articles such as containers or bottles by first injection molding a preform or parison, bringing the temperature to an orientation range and transferring it to a blow molding station. The parison is retained in position at the blow molding station for insertion of a blow-orient pin which axially extends and stretches the parison in one direction and then permits air to blow the parison to the desired extent within the mold in other directions to form the configuration of the finished blown article. The article is then cooled and is transferred to an ejection station for removal from the apparatus.

In another embodiment of this invention the blow-orient pin is shorter than the parison and does not stretch it when inserted. After insertion into the parison the blow-orient pin permits air to blow into the parison expanding it in all directions to form the configuration of the finished blow article. The article is cooled and transferred to the ejection station.

The technique employed includes steps of injection molding, axial extension by stretching and then expansion by blowing air into molding to obtain biaxial orientation of the finished product, article cooling and article ejection which are separate and related to one another but adapted to operate simultaneously.

It is an objective of the present invention to provide a multiple station injection blow molding apparatus in which a single first core pin molds a parison in conjunction with a neck ring which is employed to transfer parisons from a single injection mold to each of two adjacent blow molds. Additionally, a pair of blow orient pins are arranged in side by side relationship to the single first core pin moving with it while stretching, blowing, and cooling parisons. At the same time a pair of pick-off bushings, in parallel with the blow-orient pins are positioned to transfer finished products from the blow molds to ejection stations.

The injection molding and blow molding stations are located in fixed position on a stationary platen with a single injection mold and a pair of blow molds with the injection mold therebetween. The single first core rod and the pair of second core rods are mounted on a second movable platen with the first core rod positioned between the two second core rods and the movable platen being reciprocally movable toward and away from the stationary platen so that the first core pin moves into and out of the injection mold and the two second core pins move into and out of the two blow molds respectively.

The blow-orient pins may be made shorter or equal to the first core in height. In this way no stretching takes place, except by air blowing from blow-orient pins.

Located between the stationary and moving platen is a floating platen acting as part of the transfer means. The floating platen is designed so that it will reciprocate toward and away from the stationary platen and the injection mold station and blow mold stations and will reciprocate laterally with respect thereto so as to become aligned with injection mold station, blow mold stations, and ejection stations on either side of the stationary platen portion containing the blow molds and the injection mold. It is an objective to provide the floating platen with the support structure including neck ring and core bushing assemblies for the parison and the finished product and facilitate movement of the parison and finished product between the mold stations and the ejection stations.

It is an objective of the present invention to provide cooling means on the molds, the transfer structure on the floating platen, and the core pins on the movable platten so that a multiplicity of cooling steps are achieved for the parison and finished product during the molding procedure.

It is a further objective of the present invention to provide a valve structure on the second core pins to facilitate introduction of air from the core pin when the pin is located in a blow mold and acting in the molding operation, the valving structure permitting gas, which can be air, water vapor, carbon dioxide, nitrogen, etc, to escape within the blow mold and through the valve outside the blow mold to atmosphere facilitating cooling.

It is also an objective to provide an apparatus which requires no discharge ejection stations and the finished products can be ejected directly from the blow molding station by stripping and gravity.

A further objective of the present invention is to provide temperature controls for both heating and cooling when required to obtain the parison molding of the desired configuration together with biaxial orientation of the blown bottle.

Still a further objective is to provide a transfer injection blow molding machine employing two blow mold stations being fed alternately from one injection mold station and one first core rod, together with two finished product ejection stations for removal of the finished products.

Still a further objective is to provide a system where a single blow-orient pin will act in the biaxial orientation of a parison by first mechanically stretching the parison in one direction and then permitting air to blow the parison in a further direction for achieving biaxial orientation of a finished product.

A further objective of the present invention is to provide a blow plug in the base of each blow mold to engage with the parison being axially stretched by engagement with a second core rod to facilitate control of limitation of the stretching distance of the parison during the molding into the finished configuration.

A further objective is to provide a first core pin to mold a parison and to bring it to the desired temperature for biaxial orientation and blowing. Only one first core pin is required rather than two parallel sets working alternatively. Also, this first core does not have to have blowing vents which will make it cheaper, stronger and better able to control temperature.

As stated, the first core rod which molds the preform need not have to have air vents and need not require air for stripping the parison. Air may be used to assist in stripping but the primary stripping means is the neck ring core bushing which pull the parison off of the core rod.

It is a further objective of the present invention to provide the floating platen with improved support means for the parison and the finished product to facilitate control thereof and cooling thereof during transfer between the molding stations and the ejection stations. It is contemplated that the support structure can include a pair of side by side core bushing and neck ring assemblies and a pair of spaced pick off bushings with the core bushing and neck ring assemblies therebetween. The bore bushing and neck ring assemblies are positioned to shift parisons from the injection mold station to a blow mold station and the pick off bushings are in position to hold the finished products and transfer the finished products to the ejection stations.

It is an objective of the present invention to provide a single injection blow molding apparatus which reduces molding cycle time, provides better support for the parison and permits the use of a single core rod usable for stretching and molding procedures thus providing a lower cost system by reducing the number of component parts and eliminating the necessity of a higher than desired degree of precision for the parts. Also, by providing the simplified structure of the present apparatus for high speed operation and close handling and cooling temperature control of the molded products from beginning to end, the support plattens can be lighter thus further reducing the cost and handling problems.

An added objective of the present invention is to provide an alternative single injection blow molding apparatus with at least one intermediate temperature conditioning or precure molding station between the injection molding station and the blow molding station to provide for further temperature conditioning of a pre-blown parison when and if desired. It is contemplated that the mold at the pre-cure molding station be adapted to receive a pre-blown expanded parison or unexpanded parison. Also, the mold at the pre-cure station can be split or one piece. The temperature conditioning at the pre-cure mold can be conducted for a predetermined length of time and may be heating or cooling of the parison. Among the objectives of the alternate system with the intermediate pre-cure temperature conditioning mold is to provide for a core along with the pre-cure mold at the pre-cure molding station which will assist in the seasoning of the parison for orientation and blowing. A separate pre-cure transfer core pin is provided for each pre-cure mold and operates simultaneously with the other core pins in the molding process. The parison is transferred from the injection mold to a pre-cure mold, then from the pre-cure mold to the blow mold, and finally from the blow mold as a finished product to the ejection station.

An objective is to allow for positive removal of the parison from the first core by stripping. This eliminates problems such as unblown parisons going back to the injection cavity.

In summary, a single injection blow molding apparatus for making a selected oriented finished product is provided. The apparatus includes a support structure and an injection molding station on the support structure including injection molding means injection molding a parison into a selected configuration. The injection molding means includes a first core rod assembly cooperating in forming the parison which is formed about the first core rod. Conditioning means is provided to condition the parison to orientation temperature. Transfer means is on the supporting structure for removing the first core rod from the parison and transferring the parison to a blow molding station. The blow molding station on the support structure includes blow molding means blow molding the parison while at orientation temperature into the configuration of the finished product. The blow molding means includes a second core rod assembly having a second core rod cooperating in blowing the parison into the configuration of the finished product. The transfer means on the support structure assembles the second core rod with the parison at the blow molding station and disassembles it from the orientation finished product. The transfer means includes parison support means to hold the parison when coupled with the core rods and the injection molding and blow molding stations and when removed therefrom to facilitate formation of a finished product and removal of the finished product from the apparatus.

Other objects and advantages will become apparent from the following detailed description which is to be taken in conjunction with the accompanying drawings illustrating somewhat preferred embodiments of the invention.

BRIEF DESCRIPTION OF THE DRAWINGS

In the drawings:

FIG. 5a is an enlarged fragmentary sectional view of the apparatus in the condition of FIG. 1 and showing the blow mold station on the left side and adjacent the ejection station;

FIG. 9 is a similar plan view with the alternative press opened following the step of FIG. 8 after which the apparatus assumes the disposition shown in FIG. 6;

FIG. 10a is an enlarged fragmentary sectional view of the alternative apparatus in the condition of FIG. 6 and showing the blow mold station, pre-cure station, and ejection station on the left side of the apparatus; and FIG. 10b is an enlarged fragmentary sectional view of the alternative apparatus as shown in FIG. 6 showing the injection molding station, the pre-cure station, and the blow mold station to the right thereof.

DETAILED DESCRIPTION

Figure 1:
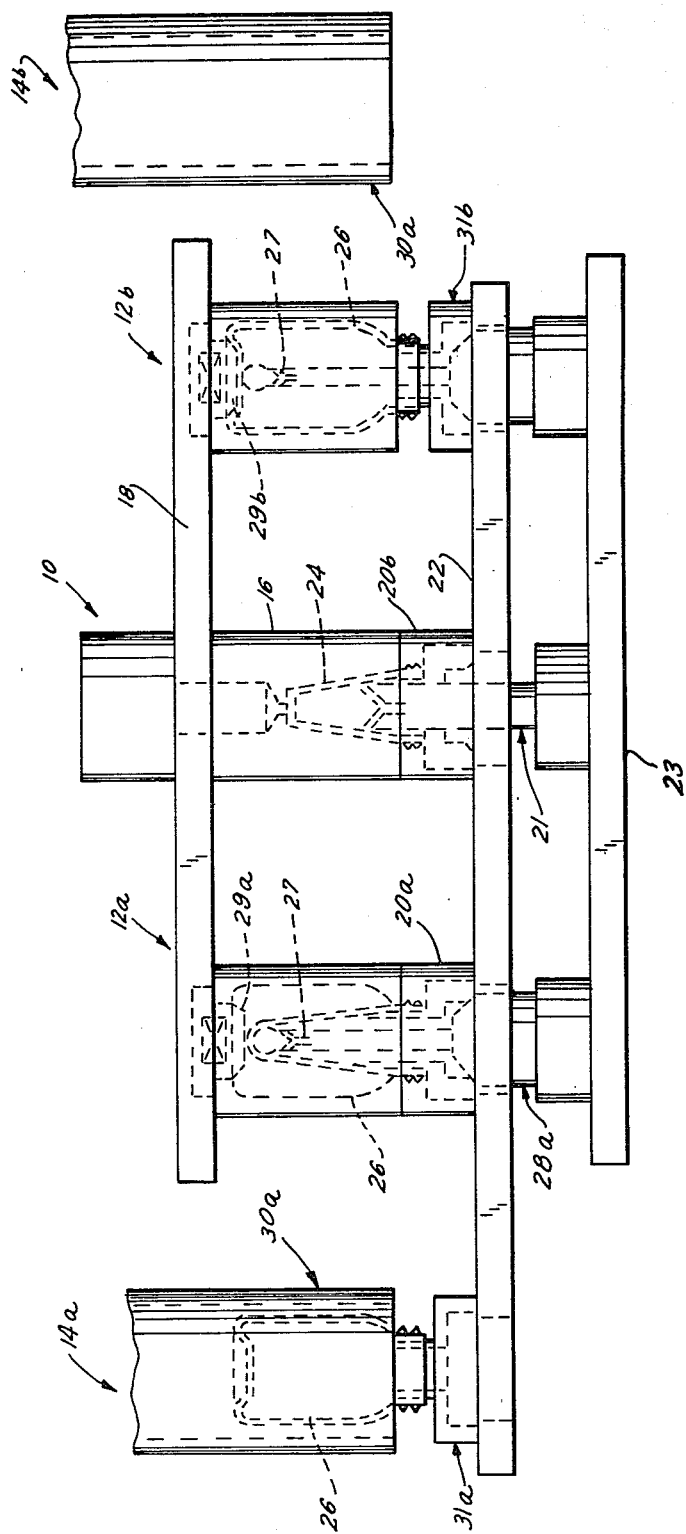
FIG. 1 is a top plan view of an injection blow molding apparatus of this invention showing the press in a closed or clamped position.

In the injection blow molding apparatus of FIGS. 1-5b, a single row of in-line stations are present, namely a preform or parison injection station 10, a pair of blow molding stations 12a and 12b on opposite sides of the parison injection station and a pair of ejection stations 14a and 14b spaced outwardly from stations 12a and 12b, respectively. At the parison injection station 10, a parison mold 16 mounted on clamping platten 18 cooperates alternately or sequentially with a pair of core bushing and neck ring parison support assemblies 20a and 20b mounted on a floating platen 22 and core rod assembly 21 mounted on movable platen 23 in forming the parison 24.

Platen 18 is a stationary portion of the supporting structure for the machine or apparatus, floating platen 22 is capable of reciprocating laterally as shown in FIGS. 1-5 from side to side and vertically from top to bottom. Movable platen 23 is mounted on the supporting structure so that it can reciprocate upward and downward from top to bottom along with the floating platen 22 to cooperate with the fixed stationary platen 18 in the molding procedures.

Thus, core rod assembly 21 is adapted to reciprocate into and out of injection mold 16 in forming a progression of parisons in initiation of the molding procedure. The lateral shifting action of floating platen 22 permits both neck ring and core bushing assemblies 20a and 20b to be reciprocated between the injection mold 16 and the pair of adjacent blow molds 12a and 12b and accordingly are used to support the parison in transferring each parison from the injection mold 16 to either blow mold 12a or blow mold 12b. The parisons 24 once transferred to the blow molds 12a and 12b are formed into finished products 26.

Each parison 24 may be displaced from the core rod assembly 21 by a partial expansion thereof from air passed through the passage network 25 in the core rod assembly 21 while stripping. Alternatively, the parisons can be displaced by the readily available means such as collapsing core pin 21, pulling the parison off the core pin or by using neck ring as a stripper or by providing the core pin with a lubricant surface.

Figure 2:
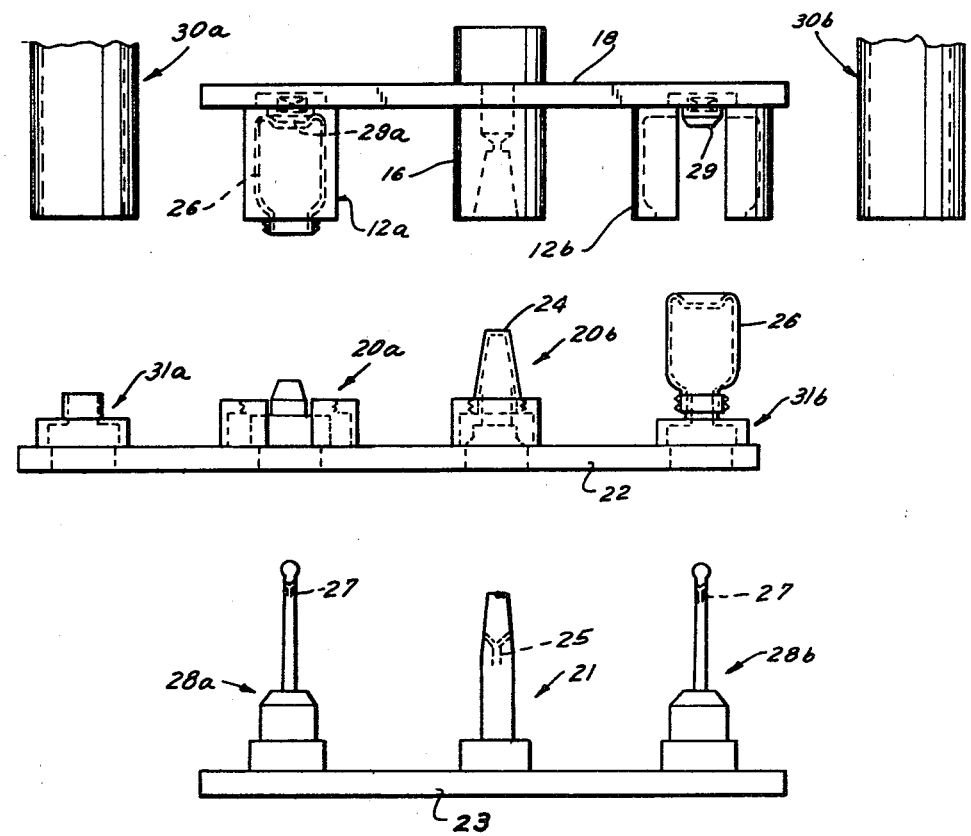
FIG. 2 is a similar top plan view of the press opened.

The parison 24 as shown in FIG. 2 is then supported by a bushing and neck ring assembly 20b or 20a, whichever is in alignment with the injection mold 16 whereupon lateral movement of floating platen 22 will bring the supported parison into alignment with the appropriate blow mold 12a or 12b. After lateral movement of floating platen 22 to an adjacent station relationship, the moving platen 23 is directed into engagement with stationary platen 18 and floating platen 22 moved along therewith thus extending partially expanded parison 24 into an aligned blow mold.

Figure 3:
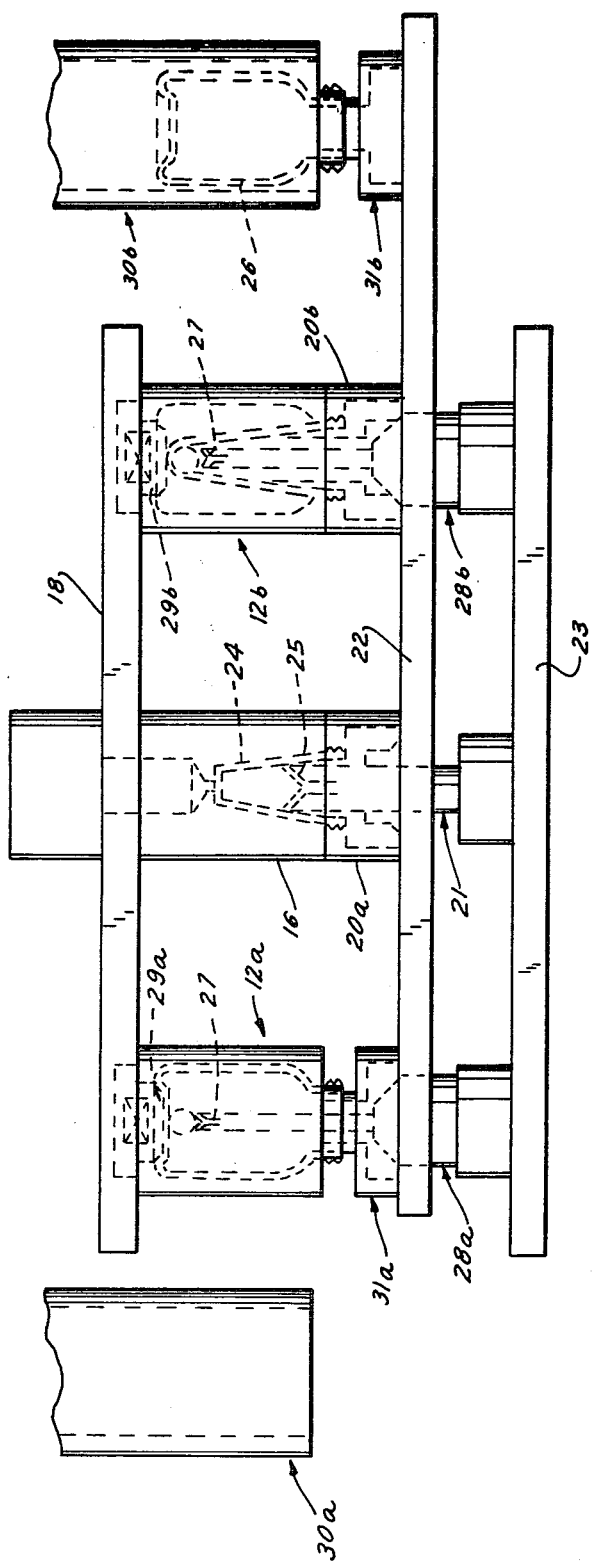
FIG. 3 is a similar plan view with the press closed after the floating platten has been shifted linearly to the right to transfer a parison to a blowing station, and a finished product to an ejection station.
Figure 4:
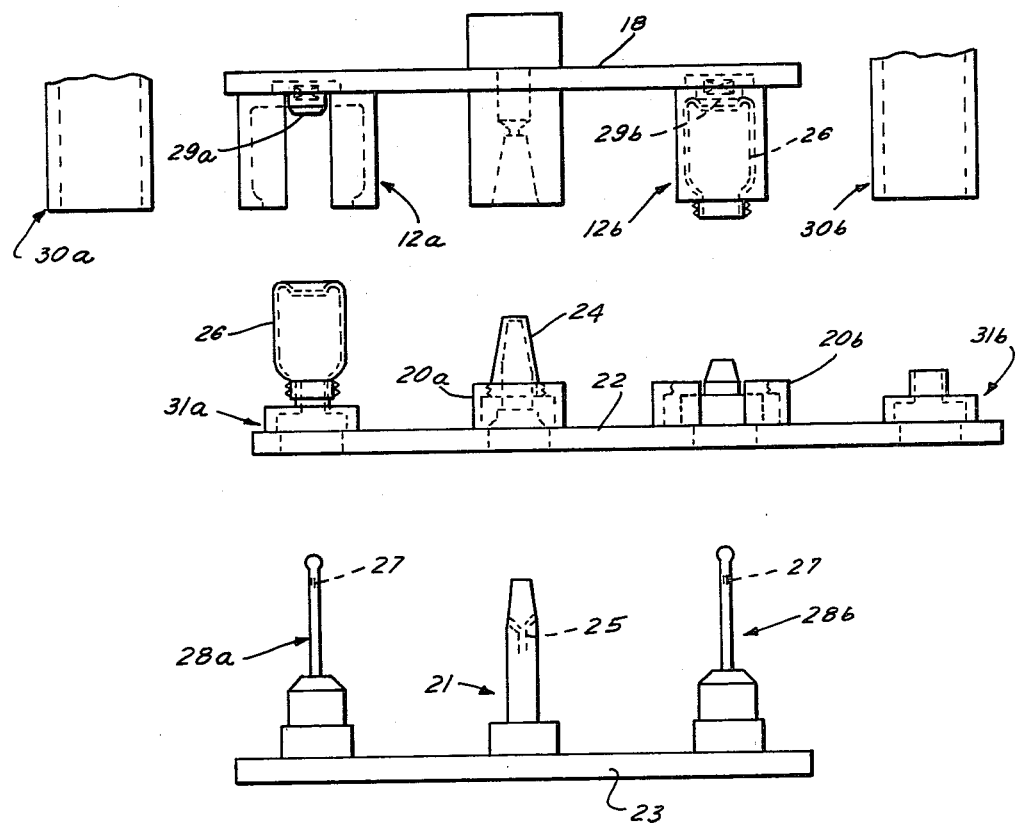
FIG. 4 is a similar plan view with the press opened following the step of FIG. 3 after which the apparatus assumes the disposition shown in FIG. 1.
Figure 5B:
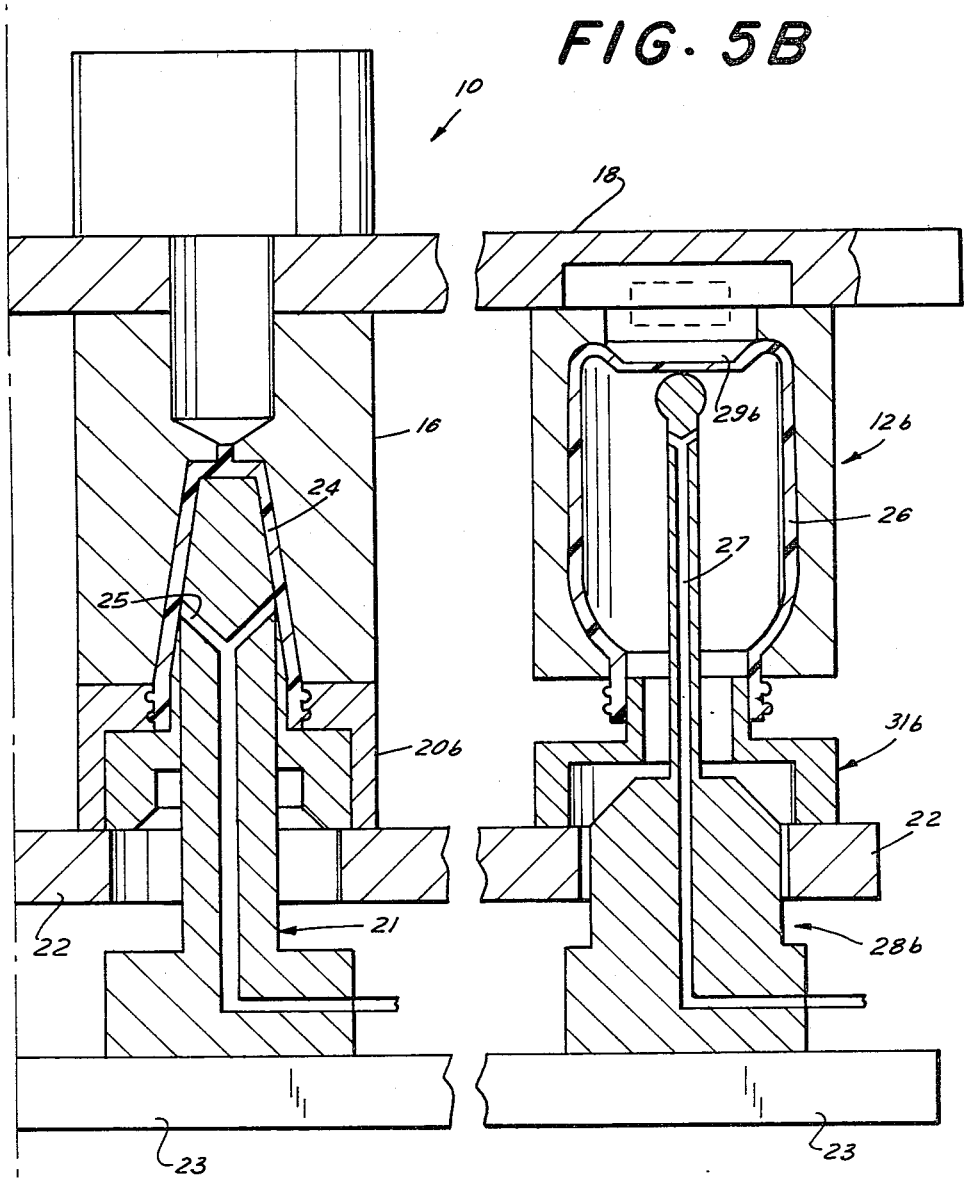
FIG. 5b is an enlarged fragmentary sectional view of the apparatus as shown in FIG. 1 showing the injection molding station and the blow mold station to the right thereof.
Figure 6:
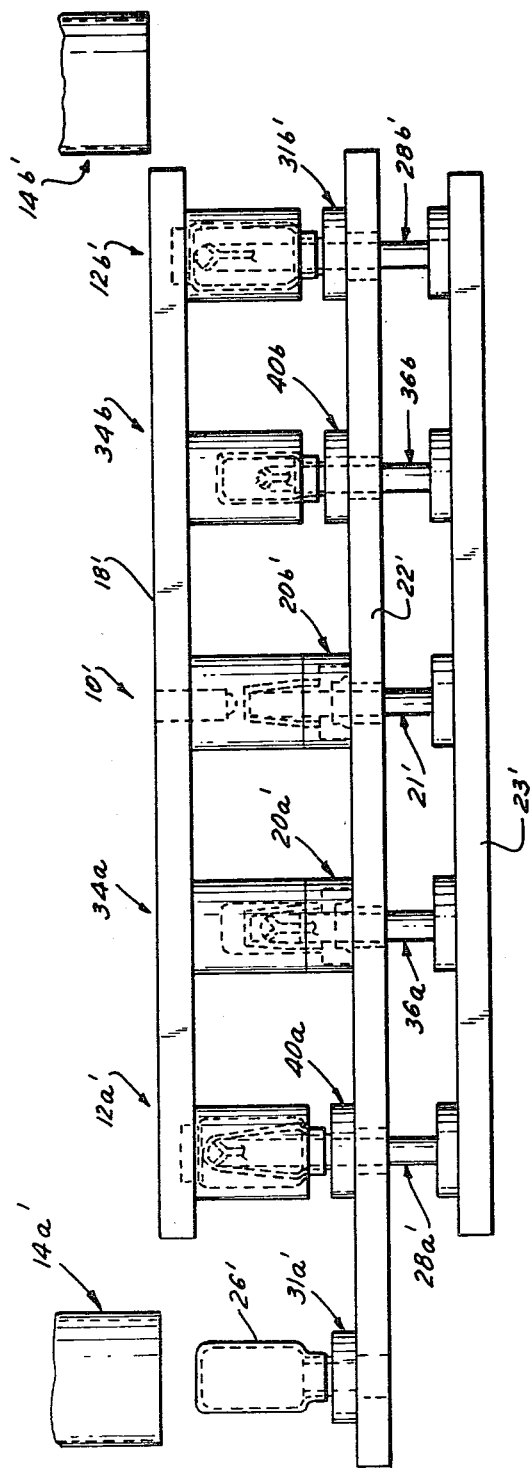
FIG. 6 is a top plan view of an alternative injection blow molding apparatus of the invention showing the press in a closed or clamped position.
Figure 7:
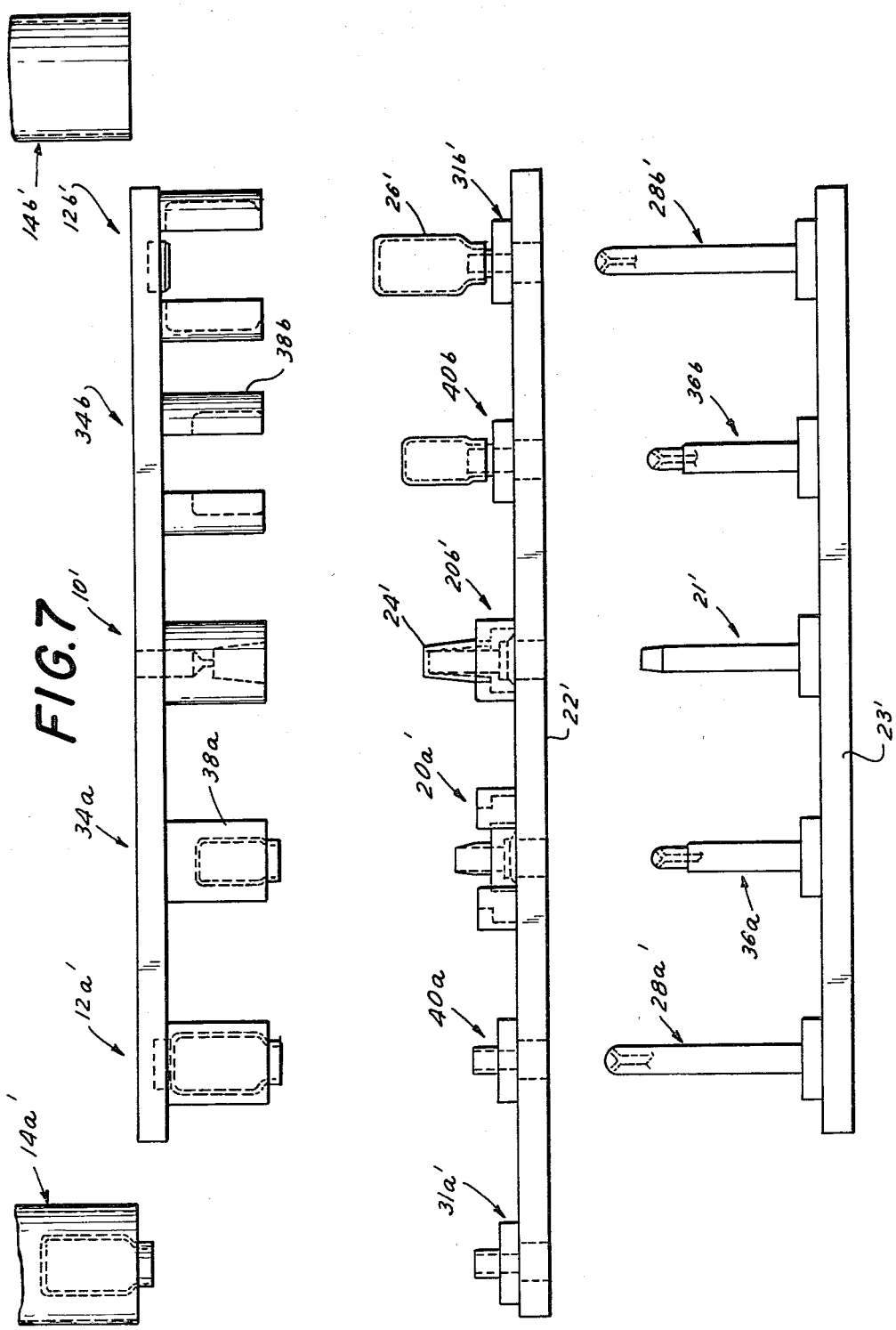
FIG. 7 is a similar top plan view of the alternative press opened.
Figure 8:
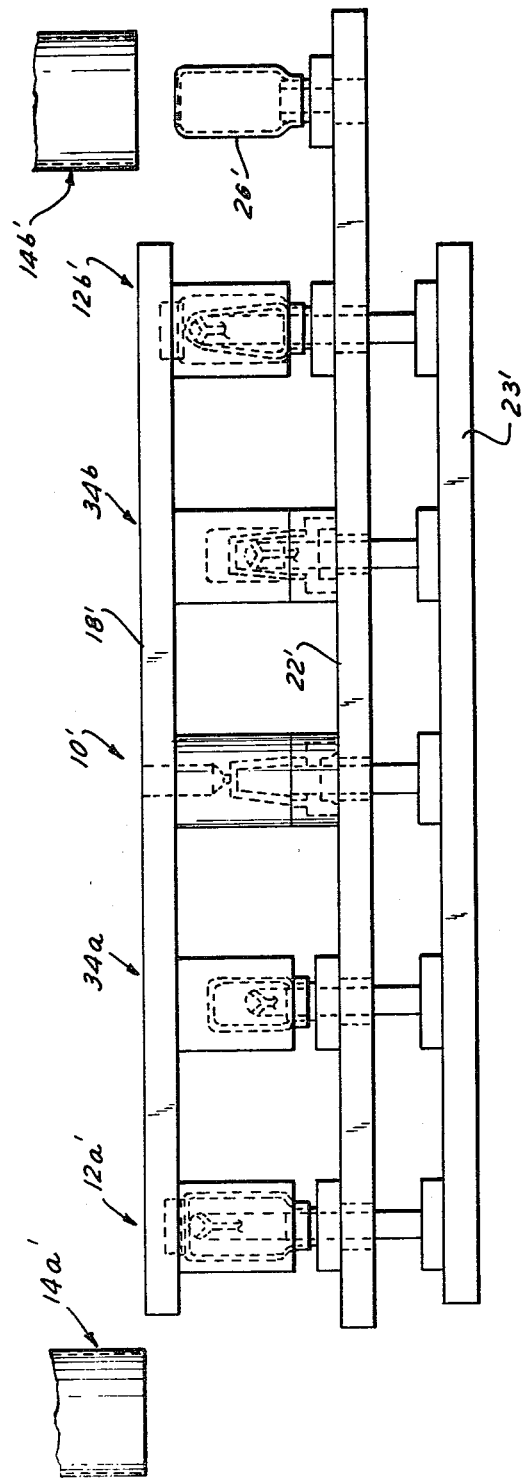
FIG. 8 is a similar plan view with the alternative press closed after the floating platen has been shifted linearly to the right to transfer a parison to a blowing station, a parison to a pre-cure station, and a finished product to an ejection station.

At the same time, core rod assembly 21 is reinserted into the injection mold 16 for formation of a new parison and a pair of second core rod assemblies 28a and 28b located respectively on each side of core rod 21 on movable platen 23 are inserted into the aligned blow molds 12a and 12b respectively along with the partially expanded parison. The parison 24 is first axially expanded by stretching during the insertion of a core rod 28a or 28b during the insertion of the core rods 28a and 28b as depicted in FIGS. 1 and 3 and then laterally and radially blown into final configuration by air passing through the passage network 27 of each second core rod 28a and 28b. The formed final receptacle 26 is then permitted to cool in the molds 12a and 12b and is transferred from the blow mold station to the ejection station or at least to a product removal mechanism as shown in the form of a chute 30a and 30b which cooperates in removing the finished receptacle from the accommodating pick off bushing 31a and 31b located adjacent to the core bushing and neck ring assemblies 20a and 20b respectively on floating platen 22. As the movable platen 23 is removed from stationary platen 18 so is floating platen 22 and then floating platten 22 moves laterally so that each station thereon is aligned with the next adjacent station associated with the stationary platen 18. In this manner, a finished product 26 removed from blow mold 12a or 12b is supported by a pick off bushing 31a or 31b and transferred into alignment with a discharge chute 30a or 30b respectively for removal of the finished product from the apparatus.

Although a single row of stations is illustrated in the drawings, it should be understood that multiple rows of such stations may be on the platens 18, 22 and 23 not only in a horizontally disposed line as illustrated but vertical as well or in parallel line; and similarly, the platens 18, 22 and 23 could be horizontally disposed rather than being vertical as shown where desired or necessary. Other arrangements could also be employed.

Mechanism for accomplishing the vertical reciprocation of platens 22 and 23 and the horizontal reciprocation of platens 22 is of a well known type in the art and for this reason will neither be described nor illustrated. Obviously, clamping plate 18 may be reciprocated with platens 23 stationary.

Blow cooling of the parison is accomplished in a convenient manner such as by the use of a poppet valve in the core pin which is responsive to a controlled pressure to open and permit escaping air as part of a circulation system to cool the parison in the desired manner. The air would be forced through a passageway in the core pin and force open a poppet valve to escape from the core pin within the parison and operate as a coolant.

Core rod assembly 21 is aligned with parison injection mold 16 and form the injection station. In each cycle, the core rod assembly 21 is disposed within the cavity of the mold 16 for purposes of receiving the injected plastic shot employed in molding the parison 24. The core rod assembly 20 may be essentially of the type disclosed in the above referenced patents. To complete the injection station, one of the two core bushing and neck ring assemblies 20a and 20b for parison support is aligned between the mold cavity of mold 16 and the core pin assembly 21 to be coupled therebetween during the injection molding process. These core bushings and neck ring assemblies include conventional split neck structures to permit their opening and closing laterally as depicted in the drawings. The structure includes an inner core bushing parison support 32 and an outer clamping neck ring 33. This is true for each of the assemblies 20a and 20b. Assemblies 20a and 20b cooperate with parison injection mold 16 and first core rod assembly 21 in defining the shape of the parison 24. For certain types of containers a one piece assembly can be used for core bushing and neck ring assemblies 20a and 20b instead of the depicted split neck type. The choice of assembly depends upon the size, shape and type of containers being formed.

Upon reciprocation of the floating platen 22 and simultaneous reciprocation of moving platen 23, and assuming the condition shown in FIG. 1, the parison mold 16 will be disposed about the core pin 21 into engagement with the neck mold and parison support assembly 20b to define the parison forming cavity. The parison 24 is formed upon the injection into the cavity of the selected plastic melt under controlled pressure and temperature with uniform density as explained in the above patents.

The mold 16 and particularly its cavity is carefully temperature controlled, electrically or by fluid (water or oil) in a manner well known to the art. In this connection, the mold 16 is at elevated temperature whereas the parison support bushing and ring assembly 20b is cooled to set the configuration of the neck as early as possible in the molding process. Core pin 21 is also heated either by means of liquid or electric heat. If desired, the core pin could be cooled by the same means. In this manner, a skin is formed on the outer surfaces of the parison 24 and on the inner surfaces thereof whereby the parison 24 is correctly "seasoned" in the parison mold 16 for stretching and blowing. For such purposes, the movable platen 23 and the floating platen 22 are retracted to the position shown in FIG. 2. The parison 24 is supported by the assembly 20b and the cooling process is continued. Thereafter, floating platen 22 reciprocates to the right to assume the relative disposition as illustrated in FIG. 3 prior to the forward reciprocation of platens 22 and 23.

A standard parison cavity 16 for a range of bottle sizes and weight is employed with an exchangeable temperature controlled core pin 21 and an exchangeable temperature controlled pair of parison support assemblies 20a and 20b. With these elements in the clamped injection position, a parison preform of resin 24 is injected under controlled pressure and temperature conditions. Upon completion of the injection, the plastic resin is brought to orientation temperature range by temperature control devices in the injection cavity and the core pin. Whether heating or cooling is required depends on the type of plastic material being molded. As stated above, the neck ring is cooled rapidly to make the preformed neck cool and set up.

Platens 22 and 23 will reciprocate forwardly toward stationary platen 18 to place the blow mold 12b about the parison 24 on assembly 20b and into engagement with core rod 28b as shown in FIG. 3 prior to blowing. During this procedure, the parison is still undergoing temperature change preparing for orientation and stops or plugs 29a and 29b in the base of blow mold 12a and 12b respectively restrain the parison from further movement at this time and may assist in temperature control. Naturally with respect to the embodiment of FIG. 3, plug 29b is applicable for this purpose.

Assembly 20b continues to cool the plastic parison neck with the conventional temperature control means mounted thereon and the conventional temperature control device within the mold 12b and in core pin 28b brings the parison to orientation range. Cool or warm air may be used on the outside of the parison entering from appropriate vents in the mold cavity. The ultimate object is to bring the parison into proper orientation. Stop or blow plug 29b which is spring loaded such as the end of the parison 24 or alternatively is about 1/16 inch in from the parison end. The stop 29b is temperature controlled also. Flow pressure air is momentarily introduced or puffed into parison 24 to bring it into the configuration 26 as depicted in FIG. 3. The air can enter the parison in a conventional fashion such as through air vents 27 in core pin 28b. In this manner, the plastic parison is expanded off of core pin 28b and the air pushes the parison against the confining walls of the mold 12b to form the configuration of the final product 26.

The secondary core pin assembly 28b which is lined up with the parison 24 is extended into the mold cavity of mold 12b as platens 22 and 23 close. As the assembly closes, pin 28b extending into the stripped parison 24 stretches the parison 24 longitudinally from the inside while the stop 29b supports the outside of parison 24. Since the parison is at the proper temperature range, the stretching orients the parison molecules. It also stretches the parison to the proper length as determined by stop 29b to obtain the desired amount of orientation in one direction and to permit uniform stretching of the parison side walls.

The stop 29b is then forced back into its blowing position. Stop 29b can be mounted in any convenient fashion for adjustment purposes such as by use of springs. When the mold 12b is totally closed and the parison is fully stretched, high pressure air enters the parison from the central shaft and connecting apertures 27 and pin 28b. This high pressure air or other gas expands the parison to the finished container shape 26 as depicted in FIG. 1. The container takes the shape of the blow cavity of mold 12b.

Since the parison does not expand much further longitudinally having already done so, but does radially, it now orients again at right angles to the previous orientation. The container cools and is then biaxially oriented. The result is an increase in impact strength, tensile strength and stiffness. Additionally, the biaxial orientation decreases gas permeation factors as well.

By use of interchangeable or adjustable molds, different size and shape containers can be formed. Only a single injection cavity and a single injection molding core rod 21 and a single core rod for each blow mold need be employed.

Core pin 28b and parison support assembly 20b are then withdrawn leaving the parison within the mold 12b. Bushing and neck ring assembly 20b opens as shown in the drawings to permit its release of the article 26 within the mold and withdrawal therefrom. The article 26 is retained in the mold for further cooling.

The parison weight and article wall thickness may be changed by changing core rods. Thus, core rods of different dimensions can be utilized to accomplish these results.

The container or article 26 is held in place by the interengagement between the article 26 and the bottom wall of the mold cavity and by interengaging surfaces between the article neck and the mold cavity. Alternatively, the core pin 28b can be removed by collapsing it and withdrawing it from the parison, by coating the surface of the pin with a lubricant, by pulling the parison from the pin from within the mold, or any other readily available means such as stripping.

Floating platen 22 then transfers linearly again until pick off bushing assembly 31b is brought into alignment with core pin 28b and mold 12b. The resultant position would be the same as that depicted in FIG. 1 prior to movement of the platen 22 and 23 toward stationary platens 18.

When platens 22 and 23 retract, after the mold clamp has opened, the container 26 is extracted from the blow cavity of mold 12b and supported on pick off bushing assembly 31b.

Floating platen 22 then linearly traverses to the right to bring pick bushing 31b and container 26 in alignment with the ejection chute 30b. However, alternatively, this shifting action can bring pick off bushing 31b and container 26 to a location removed from the apparatus whereby the finished product or container 26 can be removed in any conventional fashion and permitted to fall by gravity from the apparatus.

With the depicted embodiment, upon a further molding step whereby platen 22 and 23 are again moved toward stationary platen 18, container 26 will be inserted into ejection chute 30b where appropriate force such as suction can be applied to remove the container from the bushing 31b and directed to a collection location.

To briefly summarize the general operation of the present system as depicted, plastic resin is initially injected into the cavity of the parison mold 16 and assembly 20b and core rod 21 combination at the parison molding station to form a parison 24. The press opens by the retraction of platens 22 and 23 permitting the core rod assembly 21 to be removed from the mold cavity and the parison while the parison is supported by assembly 20b on floating platen 22. The parison 24 is removed from the mold 16 as floating platen 22 is removed. This is the condition for assembly 20b as depicted in FIG. 2.

The linear transfer mechanism is then actuated to cause floating platen 22 to shift laterally to the right to align assembly 20b containing parison 24 with blow mold 12b at a blow molding station. At the same time the second core bushing and neck ring assembly 20a is brought into alignment with injection mold 16 for forming of a further parison 24. Also at this time, pick off bushing 31a is moved into alignment with the remaining other blow mold 20a containing a finished article 26.

The press closes once again to the position depicted in FIG. 3 and the parison 24 is expanded by cooperation between secondary core pin 28b, assembly 20b and blow mold 12b into the expanded condition. Once this has occurred, and the neck of the article 26 has cooled, the assembly 20b opens and the press opens leaving the expanded article 26 in the blow mold cavity of mold 12b for further cooling as the press is opened.

At the same time, secondary core pin 28a and pick off bushing 31a will engage expanded article 26 in the cavity of mold 12a. Thereafter, as the press opens and platens 22 and 23 are withdrawn, the fully formed container 26 will be carried from the blow mold on pick off bushing 31a to be held thereon for further cooling.

The platen 22 is then reciprocated in the opposite lateral direction to its other lateral position to aling the core rod assembly 28a with the blow mold 12a and the pick off bushing 31b with an expanded article 26 in the cavity of mold 12b. Simultaneously pick off bushing 31a containing the finished product 26 will be shifted into alignment with ejection chute 30a and support assembly 20a with a parison 24 thereon will be brought into alignment with the second mold cavity 12a.

Thereafter, when the press closes, as shown in FIG. 1, finished product 26 will be entered into ejection chute 30a and removed from pick off bushing 31a. Simultaneously, parison 24 on assembly 20a will be expanded to permit its removal from assembly 20a in mold 12a. At the same time, assembly 20a and parison 24 thereon will be inserted into the cavity of mold 12a with core rod 28a engaging with the bottom of the parison 24 and stretching the parison longitudinally thereby orienting the molecules of the parison in that direction. This action continues until the parison bottoms against stop 29a which determines the length required for desired orientation in one direction. Air is then blown through the aperture passageway 27 in core rod 28a to expand the parison 24 laterally and orient the molecules of the parison in the second direction. The parison takes the form of the entire mold cavity with the plug 29a being retracted to the base of the mold cavity.

After radial expansion has been accomplished by blowing through core rod 28a and to accomplish an initial cooling action, then a second blowing step is conducted to further blow air through core rod 28a to finish the cooling action of the fully expanded parison. In this manner, with this two step blowing and cooling action, the cycle time is materially reduced.

At the same time, as shown in FIG. 1, the first core rod 21 and support assembly 20b are coupled with the injection mold cavity 16 to form a new parison 24.

Further as shown in FIG. 1, at the same time, pick off bushing 31b and core rod 28b are reassembled with mold 20b and cooled container 26 contained therein.

At the end of an appropriate cooling cycle, the molds are opened and platens 22 and 23 are removed from stationary platten 16 into the position depicted in FIG. 2. Pick off bushing 31b supports a finished container 26, assembly 20b supports a new parison 24, and support assembly 20a has opened to permit container 26 to remain in the cavity of mold 12a for further cooling. A finished container 26 has been removed from bushing 31a through chute 30a and thus bushing 31a is free for pick up of a further finished container which will be the container 26 retained in the mold cavity of mold 12a.

Floating platen 22 then shifts laterally to the right and the platen 22 and 23 close with stationary platens 18 into the position depicted in FIG. 3. In this position, pick off bushing 31a is engaged with container 26 in mold 12a for removal thereof to the ejection station, support assembly 20a and core rod 21 are engaged with mold cavity 26 for injection molding in a new parison 24, support assembly 20b and the parison thereon and secondary core pin 28b are coupled to introduce parison 24 into the cavity of mold 20b and biaxially orient and form a finished container therein in the manner previously described. Finally, the container 26 of bushing 31b has been inserted into discharge chute 30b for removal by suction or similar means. Thereafter, the press is opened and platen 22 and 23 reciprocate away from platen 16 and the procedure described above is repeated for continuous production of containers or similar articles.

Naturally the ejection station could be another type of work station such as a decorating, printing or filling station where further operational steps are preformed on the finished container.

FIGS. 6–10b show an alternative embodiment of the invention with similar components being provided with similar numerals and the addition of a prime (') added thereafter. The additional structural change is in the provision of a separate pre-cure station located between the injection station 10' and each of the two blow molding stations 12a' and 12b'. As shown in the drawings pre-cure station 34a is located between blowing station 12a' and injection station 10'. Similarly, pre-cure station 34b is located between injection station 10' and blowing station 12b'. These pre-cure stations are in line with the injection, blowing and ejection stations as discussed in connection with the previous embodiment and include separate pre-cure parison core pins 36a and 36b respectively. As shown, the pre-cure core pins 36a and 36b are shorter than core pins 28a' and 28b' since they do not act in stretching the parison. Pre-cure stations 34a includes a pre-cure mold 38a and similarly pre-cure station 34b includes a pre-cure mold 38b. The molds 38a and 38b are in alignment with core pins 36a and 36b so that reciprocation of movable platen 23' will shift the core pins 36a and 36b reciprocally into and out of the molds in alignment therewith as the remaining core pins mounted on movable platen 23' are shifted as discussed in connection with the previous embodiment.

With the exception of the pre-cure stations 34a and 34b, the remaining structure is the same as discussed in connection with the previous embodiment. The molds 38a and 38b at the pre-cure stations can be heated or cooled to precondition or pre-cure a parison between its initial formation at the injection station 10' and before shifting the parison to the blow molding stations 12a' and 12b'. In this manner, the molded parison can be heated or cooled as desired as an intermediate step between the heating and cooling that may be accomplished at the injection station 10' and the heating and cooling that is accomplished at the blow molding stations 12a' and 12b' where the finished product is formed.

Naturally in utilizing the intermediate pre-cure stations, an appropriate pick off bushing is provided for each pre-cure station on the floating platen 22'. Bushing 40a is shiftable between alignment with pre-cure station 34a and blow molding station 12a and supports the parison during its shifting between the pre-cure station 34a and the blowing station 12a. Similarly, a bushing 40b is provided on floating platen 22' in alignment with the pre-cure station 34b for facilitating transfer of the parison between the pre-cure stations 34b and the molding station 12b and acts in the similar manner as the transfer bushings described above in connection with the embodiment of FIGS. 1–5 and similarly to the action of corresponding bushing and 40a of this alternative embodiment.

The sequence of operational steps in FIGS. 6–9 are identical to those depicted in connection with FIGS. 1–4 in respect to the previously discussed embodiment and the product is formed in a similar manner with the additional step of an intermediate pre-cure station as just described. FIGS. 10a and 10b show the details of the interior of the core pins and the appropriate passageways used in the heating and cooling procedures for conditioning the parison as it is being treated between the initial injection molding station 10' until it reaches the ultimate completed product transferred to the ejection stations.

When the parison is inserted into a pre-cure mold, either molds 34a or 34b, it may be expanded (preblown) by air or not as desired. Also, the pre-cure molds can be split, as shown, or of one piece design like the injection cavity of the mold at injection station 10'. The pre-cure molds at pre-cure stations 34a and 34b and the pre-cure core pins 36a and 36b may be heated or cooled. Core pins 36a and 36b along with pre-cure molds 38a and 38b will therefore be able to season the parison for orientation and blowing.

In conclusion, several factors and advantages of the present invention should be kept in mind. The floating platen 22 is adapted to move vertically and horizontaly while the movable platen 23 reciprocates vertically toward and away from the mold cavities. The discharge chutes 30a and 30b are optional and the containers can be removed by other means such as simple pick off mechanisms and gravity discharge.

Only a single core pin 21 is necessary for use with the single injection mold cavity 16 thus reducing the number of core pins required for the apparatus.

The parison 24 which is formed in cavity 26 is removed by supporting it on either support assembly 20a or 20b as core pin 21 is removed. Optionally, appropriate air passageways and air means can be used for slight expansion of the parison 24 to facilitate removal of pin 21. In that case, an air channel can be provided in the core pin 21. The neck ring and bushing assemblies 20a and 20b provide improved support for the parisons.

Also, with the reduced handling and steps required in forming the containers including the reduced number of core pins handling the parisons, the cycle time is reduced to the order of 5 seconds blowing time. With this shorter time, it is possible to blow twice the product in the same time used for previous systems.

In the sequence of operations, it should be kept in mind that the neck ring which is a split ring and the diagonally opposite blow mold split before the moving platens 22 and 23 are retracted. The use of a split blow mold can be dispensed with if a bottle is formed with no parting line and certain other types of common bottles or containers.

It is conventional to have platens 22 and 23 retracting together and then stop platen 22 first and then platen 23 to the FIG. 2 position. As stated above, air can be used when necessary when parts are removed from one another to avoid problems such as stripping.

As shown in FIG. 2, the neck of the container or parison gets good support and cooling action. Among the temperature controlled elements on the apparatus are core rod 21, movable platen 23, core bushing 32, neck ring 33, and the blow mold cavity of the blow molds 12a and 12b.

In the closing operation, it is been found effective to either move platens 22 and 23 simultaneously toward stationary platen 18 or to close platen 22 first and then platen 23 thereafter.

End plugs 29a and 29b are discussed in detail above, however, they are optional and can be dispensed with when dealing with certain types of products.

It is also contemplated that a poppet valve assembly can be provided in the passage networks 27 of core pin assemblies 28a and 28b to permit air to escape when certain pressure is reached to hasten the cooling of the parison and the finished container.

It should be born in mind that the multi-stage cooling procedure for the parison and container is an advantage in reducing cycle time and hastening operation of the apparatus in forming and finishing desired products.

In those embodiments where the discharge chutes 30a and 30b are dispensed with at the discharge stations 14a and 14b respectively, the pick off bushings 31a and 31b can also be dispensed with and the finished product container 26 can freely fall by the force of gravity when removed from the blow molds.

The present system utilizes a single injection molding core pin for forming all of the parisons and uses a single secondary core pin for the biaxial orientation by stretching and blowing of the parisons into the desired configuration. This system provides for simplicity of structure, speed in operation and provides for good cooling effects.

The overall advantages include reduced cylce time, better support of the parison, the use of a reduced number of core pins while alleviating the necessity for precision construction of core pins, and the ability to use lighter support plattens in view of the simplicity of structure and the separate tri-platten arrangement.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A method of making a selected oriented finished product by use of a single injection blow molding apparatus, the apparatus comprising:
a support structure;
a first platen on the support structure;
an injection molding means and a first and second blow molding means being in line and on opposed sides of the injection molding means, the injection molding means and first and second blow molding means being mounted on the first platen;
a second platen on the support structure being axially reciprocal and laterally reciprocal relative to the first platen;
a first and second neck bushing assembly and a first and second pick-off bushing assembly on the second platen, the bushing assemblies all being in line, the first and second pick-off bushing assemblies being on opposite sides of the first and second neck bushing assemblies;
a third platen on the support structure being axially reciprocal relative to the first and second platens;
a first core rod assembly and a first and second blow rod assembly on the third platen the first and second blow rod assemblies being in line and on opposed sides of the first core rod assembly, the first core rod assembly and injection molding means cooperating alternately with the first and second neck bushing assemblies in forming an injection molding station for molding a parison into a selected configuration, the first and second blow rod assemblies and the first and second blow molds cooperating with the first and second neck bushing assemblies for respectively forming first and second blow molding stations for blow molding the finished product and alternately cooperating with the first and second pick-off bushing assemblies for respectively forming first and second cooling stations for cooling the finished product;

the method comprising:
axially reciprocating the platens relatively towards one another from a platen open position to a platen closed position;
while the platens are in the platen closed position injection molding a first parison into a selected configuration at the injection mold station defined by the relatively axially reciprocal injection molding means and the first core rod assembly and first neck bushing assembly reciprocal between an open and closed position as the platens reciprocate between their open and closed positions, respectively;
axially reciprocating the platens relatively away from one another from the platen closed position to the platen open position;
moving the first parison axially from the injection molding means and first core rod assembly at the injection molding station when the platens are reciprocated from their closed position to their open position and the injection molding means and first core rod assembly are relatively reciprocated to an open position and supporting the first parison between the open injection molding means and first core rod assembly by the first neck bushing assembly;
laterally reciprocating the second platen in a first direction to transfer laterally the first parison to the first blow molding station by the first neck bushing assembly and to axially align the first neck bushing assembly with the first blow molding means and first blow rod assembly;
conditioning the first parison to orientation temperature after injection molding and prior to blow molding;
axially reciprocating the platens to their closed position;
while the platens are in their closed position, blow molding the first parison while at orientation temperature at the first blow molding station into the configuration of the first finished product, the first blow molding station defined by the relatively axially reciprocal first blow molding means and the first blow rod assembly and first neck bushing assembly reciprocal between an open and closed position as the platens reciprocate between their open and closed position, respectively;
the first parison and a first previously made finished product being respectively supported and moved axially and laterally in the first direction between the injection molding station and the first blow molding station and between the first blow molding station and a first finished product removal station by the first neck bushing assembly and the first pick-off bushing assembly, respectively, when the platens are axially reciprocal to their open positions and the second platen is laterally reciprocated in the first direction;
the first parison being transferred from the injection molding station by axially removing the first core rod assembly from the first parison and the first parison from the injection molding means and transferring the first parison to the first blow molding station, the first previously made finished product being transferred from the first blow molding station by axially removing the first blow rod assembly from the first previously finished product and the first previously made finished product from the first blow molding means and transferring the first previously made finished product to a position for removal;
after the first parison is transferred to the first blow molding station, a second parison and second previously made finished product being respectively supported and moved axially and laterally in a second direction directly opposite to the first lateral direction between the injection molding station and second blow molding station and between the second blow molding station and a second finished product removal station, by the second neck bushing assembly and the second pick-off bushing assembly, respectively, when the platens axially reciprocate to their open position and the second platen is laterally reciprocated in the second direction;

the second parison being transferred from the injection molding station by axially removing the first core rod assembly from the second parison and the second parison from the injection molding means and transferring the second parison to the second blow molding station and the second previously made finished product being transferred from the second blow molding station by axially removing the second blow rod assembly from the second previously made finished product and the second previously made finished product from the second blow molding means and transferring the second previously made finished product to a position for removal; and two stage cooling for the blown finished product being provided by enclosing the blow molding means and blow rod assembly about the finished product twice before the finished product is removed from the apparatus.

2. The invention in accordance with claim 1, wherein the first platen is stationary and the injection molding means at the injection molding station is stationary and the blow molding means at both blow molding stations is stationary.

3. The invention in accordance with claim 1, wherein each neck bushing assembly is adapted to be opened and closed in coordination with opening and closing of each blow mold means at a blow molding station associated therewith.

4. The invention in accordance with claim 1, wherein each pick off bushing assembly shifts between alignment with its associated blow molding station and alignment with an ejection chute to facilitate removal of the finished product from the blow mold station and transfer of the finished product to the discharge chute for removal.

5. The invention in accordance with claim 1, wherein the two cooling stages are provided when the finished product has been blown in the blow molding station and the second when this finished product remains in the blow molding means while the next molding parison is transferred to the other blow molding means.

6. The invention in accordance with claim 1, wherein each finished product is released at a location which permits the product to fall by gravity for collection.

7. The invention in accordance with claim 1 wherein a pre-cure molding station is provided on the support structure between the injection molding station and each blow molding station.

8. The invention in accordance with claim 7 wherein the pre-cure molding station includes means to temperature condition the parison, the pre-cure molding station including a pre-cure mold means on the first platen and a pre-cure core rod assembly on the third platen, transfering the parison from the pre-cure molding station to a blow molding station upon opening the platens and laterally reciprocating the second platen, assembling the pre-cure rod assembly with the pre-cure mold means at the pre-cure station upon closing the platens about a parison transferred on the second platen from the injection molding station to the pre-cure molding station to facilitate pre-conditioning of the parison before transfer to the blow molding station.

9. The invention in accordance with claim 8, wherein a pair of pre-cure core rod assemblies is provided on the third platen with the first core rod assembly located therebetween, the pair of pre-cure core rod assemblies being in alignment with a pair of pre-cure molding means on the first platen located with the injection molding station therebetween so that as the rod assemblies reciprocate with the third platen they will simultaneously move into and out of the axially aligned molding means.

10. The invention in accordance with claim 9, wherein a neck bushing assembly on the second platen is shiftable between alignment with the injection station and alignment with the pre-cure molding station so as to support the parison as it is shifted therebetween.

11. The invention in accordance with claim 10 wherein first and second pick off bushing assemblies are mounted on the second platen adjacent to each neck bushing assembly in position to shift between alignment with a pre-cure molding station and alignment with a blow molding station to facilitate transfer of a parison therebetween, and third and fourth pick off bushing assemblies are mounted on the second platen on opposite sides of the first and second pick off bushing assemblies in position to shift between alignment with a blow molding station and alignment with an ejection chute to facilitate removal of the finished product from the blow mold station and transfer of the finished product to the discharge chute for removal.

* * * * *